Oct. 4, 1955             R. W. TRIPP             2,719,457
SCANNING TELESCOPE HAVING ASTIGMATIZED PUPIL
Filed Aug. 19, 1946                            5 Sheets-Sheet 1
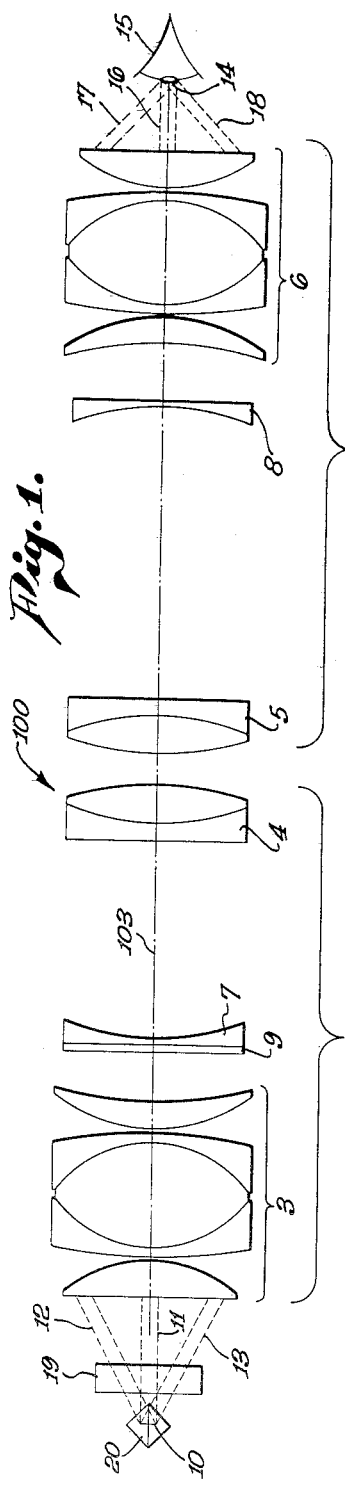
INVENTOR.
Robert W. Tripp
BY
ATTORNEY

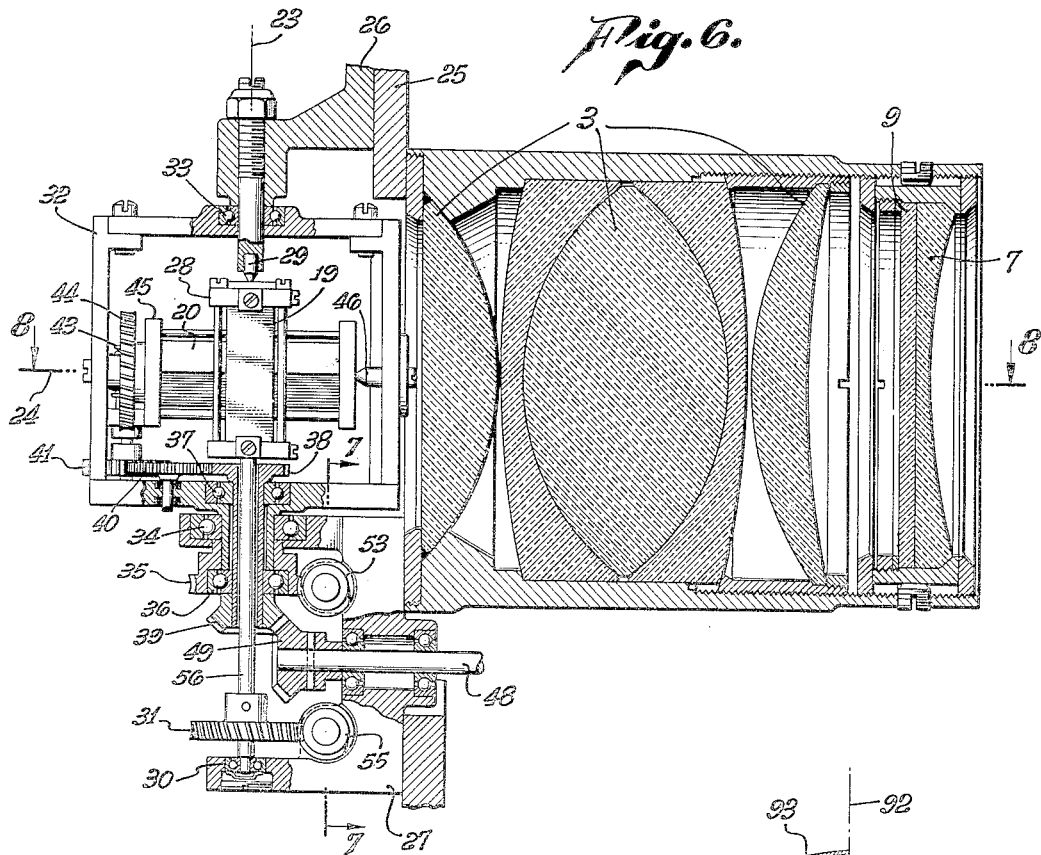
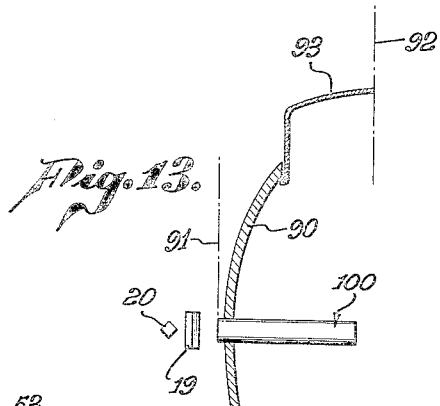
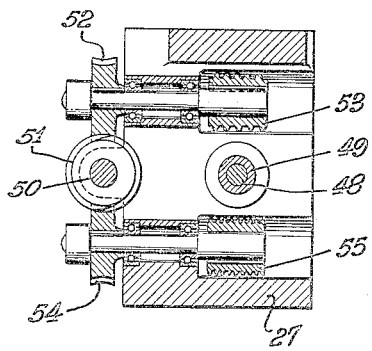

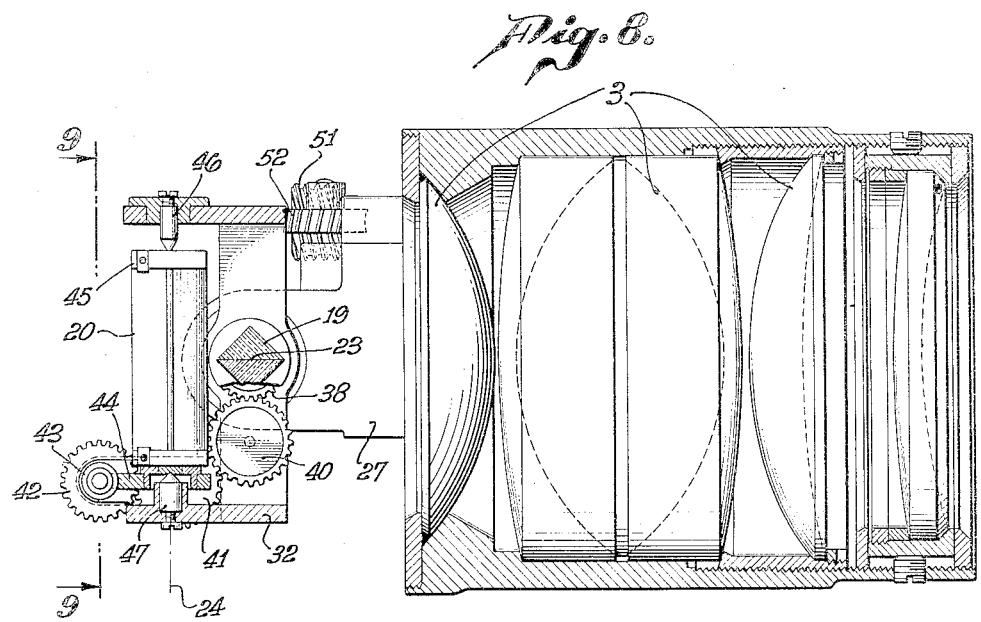
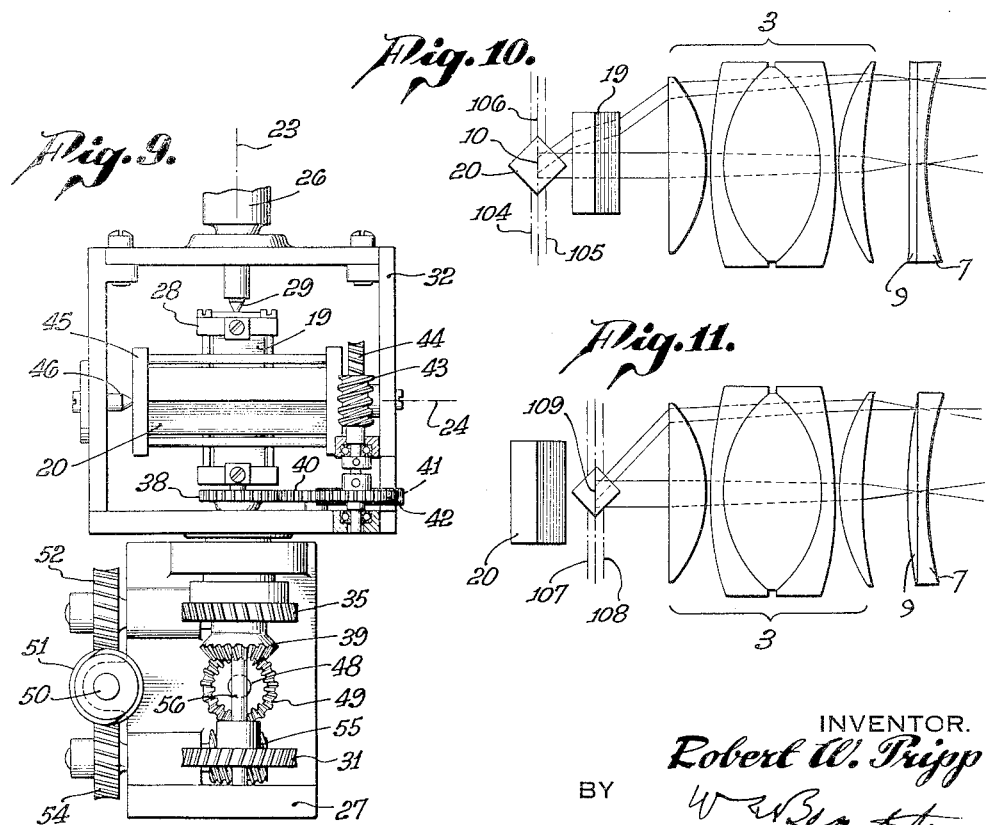

Oct. 4, 1955     R. W. TRIPP     2,719,457
SCANNING TELESCOPE HAVING ASTIGMATIZED PUPIL
Filed Aug. 19, 1946     5 Sheets—Sheet 4
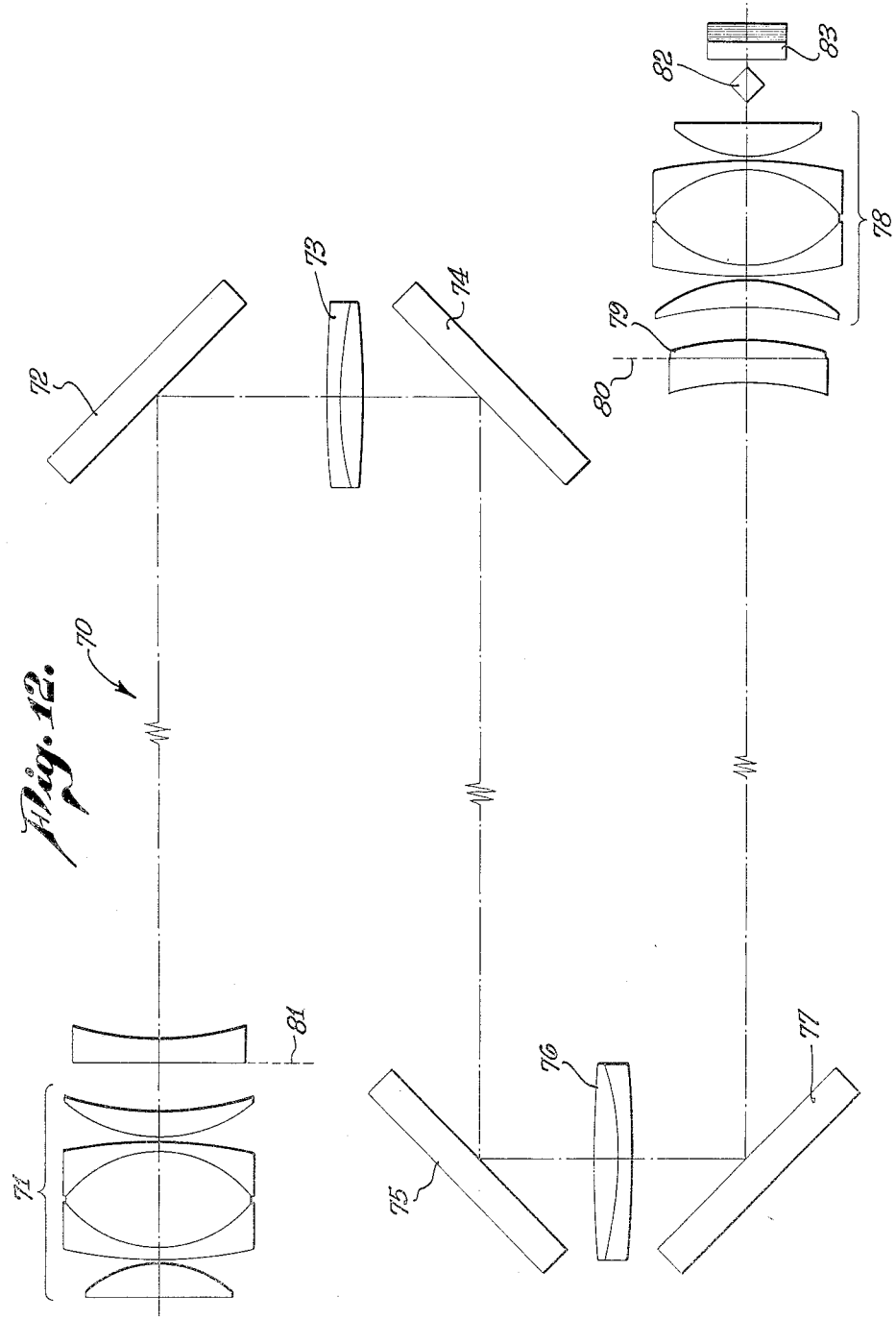

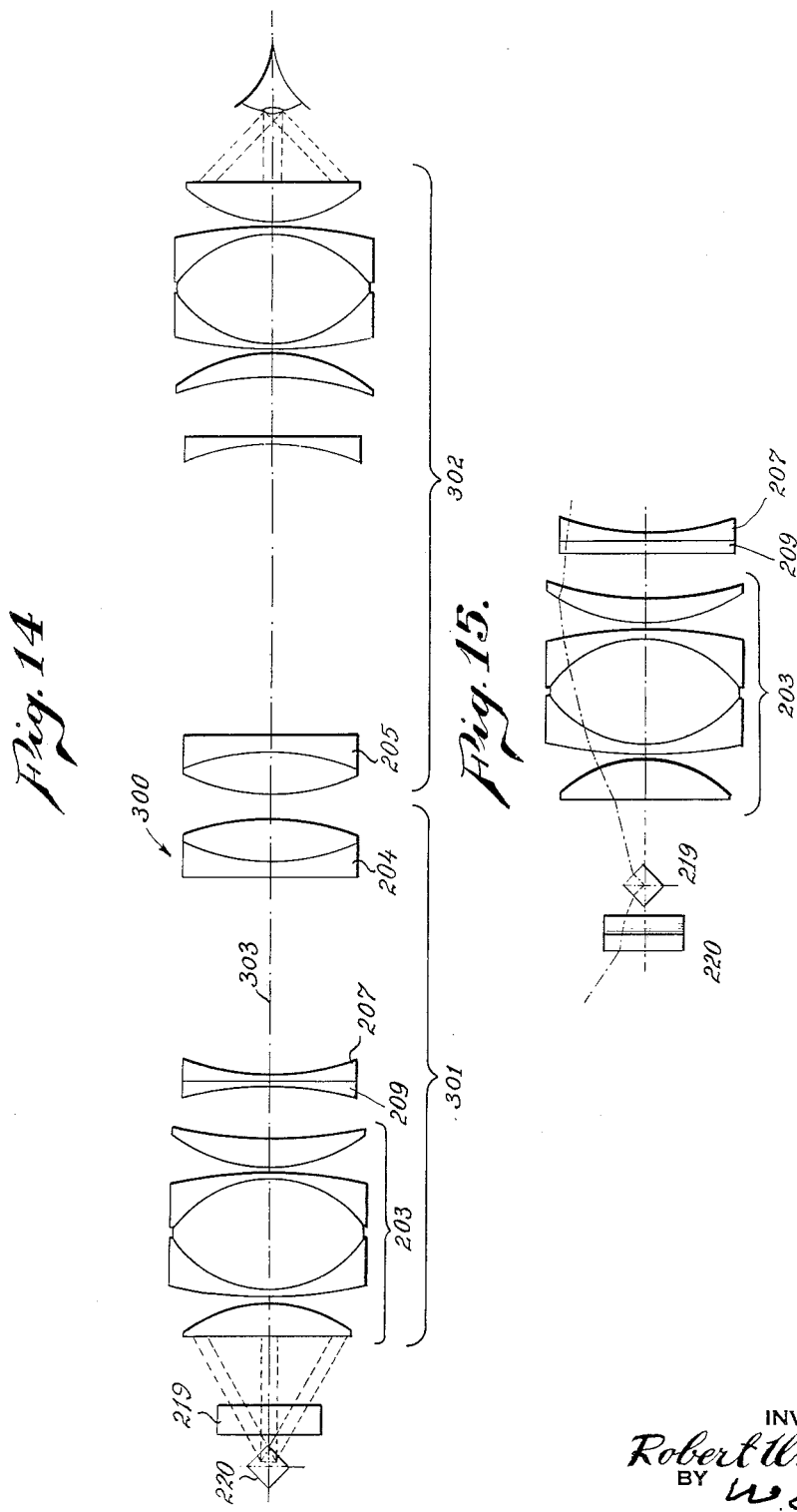

United States Patent Office 2,719,457
Patented Oct. 4, 1955

2,719,457

SCANNING TELESCOPE HAVING ASTIGMATIZED PUPIL

Robert W. Tripp, Bronxville, N. Y., assignor to Farrand Optical Co., Inc., New York, N. Y., a corporation of New York Application August 19, 1946, Serial No. 691,556

22 Claims. (Cl. 88—72)

The invention relates to an optical instrument such as a hemisphere sight, and more particularly to a telescopic sight for scanning a hemisphere.

Heretofore it has been proposed to provide a scanning device or hemisphere sight wherein the line of sight is deflected into a telescope by means of two rotatable prisms through which the line of sight passes in series. The disadvantage of this type of scanning device is twofold, namely (a) it is impossible to pass a wide field and (b) the prisms rotate in accordance with a coordinate system entirely different from the polar coordinate system employed by fire control systems, turret computers, and the like, particularly in aircraft.

One object of the present invention is to provide a hemisphere sight which will operate in a polar coordinate system the same as that employed in fire control systems, computers and the like. This is accomplished by arranging the axis of the optical system, e. g. telescope or periscope having two telescopes facing each other, perpendicular to the plane which bounds the hemisphere to be scanned, and by arranging the scanning system so that the line of sight is deviated in polar coordinates with the polar axis perpendicular to the axis of the optical system. Thus, if the axis of the optical system is horizontal and the polar axis vertical, the polar co-ordinate system of the prisms has the same orientation as that of the fire-control system currently used in aircraft.

The invention provides a hemisphere sight having front and rear scanning elements, preferably double dove prisms, having their axes of rotation at right angles to each other. The rear prism shifts the line of sight in azimuth, while the front prism shifts the line of sight in elevation and rotates in azimuth around the axis of the rear prism. Hence the requirements of the co-ordinate system are satisfied.

Arranging one prism in front of the other prism to meet the requirement of the co-ordinate system, appears incompatible with the desideratum of a wide field, as the entrance pupil should lie within the prism to transmit a wide field.

The concept of "entrance pupil" is well known in the art. If the diaphragm, or lens ring most effective in restricting the bundle of rays through the instrument is designated the "aperture stop," then the entrance pupil is the image of the aperture stop formed by optical elements of the instrument between it and the object space.

According to a further feature of the invention, a wide field of view of the order of 70 degrees is obtained with the above improved polar coordinate arrangement of scanning elements by astigmatizing the entrance pupil so that it is positioned, in one plane, in one prism, and in the plane at right angles thereto, in the other prism.

Since a lens at a focal plane has a pronounced effect on the pupil and negligible effect on the image, it is possible to astigmatize the pupil suitably by placing the proper cylindrical lens at the first focal plane.

As a result of astigmatizing the entrance pupil, its horizontal and vertical lines are brought to a focus at different loci corresponding to the loci of the two spaced prisms, with the further advantage that those prisms may be of small size.

A further advantage of the present invention is that the hemisphere can be scanned continuously, with no change-overs, and no discontinuities, except at the poles which are located at the boundary. According to the invention, the boundary or bounding plane of the scanned hemisphere extends substantially at right angles to the optical axis of the instrument. The discontinuities do not occur in line with the optical axis of the instrument or within 90° of it. Also, the elevation prism rotates in azimuth on the same axis as the azimuth prism, but at twice the speed. Since the line of sight is deviated in azimuth by twice the amount the azimuth prism is rotated, the elevation prism axis is always perpendicular to the line of sight.

Another advantage of the present invention is that the hemisphere sight makes it possible for the periscope to protrude through the side wall of an aircraft while maintaining a parallel relationship between the polar axis of the hemisphere sight and the vertical polar axis of the turret.

For purposes of illustration, the hemisphere sight of this invention is shown as applied to a periscope having the known arrangement of two telescopes facing each other. This provides a low power wide field instrument. The astigmatic entrance pupil of this invention makes it possible for the hemisphere sight to transmit the wide field which such a periscope can handle.

The entrance pupil of such a periscope is located in front of the instrument. In this case, the entrance pupil comprises two pupils, i. e., an image of the lens ring or diaphragm of each erector lens, although the result is the same as if a smaller single stop were used. The invention may be employed for either single or multiple stop systems, both of which are well known.

For further details of the invention reference may be made to the drawings wherein:

Fig. 1 is a schematic view of the optical elements of a wide angle periscope having two telescopes in face to face relation with the hemisphere sight of this invention.

Figs. 2 and 3 are views in planes at right angles to each other of the entrance end of the instrument in Fig. 1, with the scanning elements in one position of adjustment.

Figs. 4 and 5 are views in planes at right angles to each other of the entrance end of the instrument of Fig. 1, with the prisms in a maximum position of azimuth adjustment.

Fig. 6 is an enlarged vertical sectional view of the entrance end of the instrument of Figure 1, and the drive for the prisms.

Figs. 7 and 8 are sectional views on lines of the corresponding numbers in Fig. 6.

Fig. 9 is a front view in elevation looking in the direction of the arrows 9—9 in Fig. 8.

Figs. 10 and 11 are views in planes at right angles to each other of the entrance end of the instrument of Fig. 1, to illustrate that while the entrance pupil may be complex and made up of several pupils, two being shown, the result is the same as if the instrument had a single stop producing a single pupil.

Fig. 12 is a schematic view of a modification of the instrument of Fig. 1, showing additional mirrors to erect the final image although other lens or prism arrangements may be employed as well known.

Fig. 13 is a schematic vertical sectional view through the side wall of an aircraft, showing the periscope mounted therein.

Fig. 14 is a schematic view similar to that of Fig. 1 but showing an alternative embodiment of my invention;

Fig. 16 is a view in a plane at right angles to that of Fig. 14 showing the entrance end of the instrument of Fig. 14.

Referring in detail to the drawings, the periscope 100 of Fig. 1 comprises a telescope 101 facing the telescope 102, having a low power wide field and an effective entrance pupil in front of the objective 3. As well known, if the power of the telescopes 101 and 102 is the same, the power of the periscope 100 is unity, with the result that an eye indicated at 15 near the eye piece 6 would see the same wide field as if the eye were positioned at the front of the instrument. The powers of the telescopes 101 and 102 may be the same or different. The drawing in Fig. 1 does not permit showing the wide separation, usually employed for the erector lenses 4 and 5.

Periscope 100 is arranged as a hemisphere sight having a bounding plane at right angles to the optical axis 103, the prisms 19 and 20 being rotatable in accordance with a polar coordinate system having a polar axis at right angles to the optical axis 103. Prism 19 scans in azimuth and rotates about its own axis which is at right angles to the optical axis 103. The front prism 20 rotates about its own axis to scan in elevation and it rotates in azimuth around the axis of prism 19. The prism axis is defined as a line perpendicular to the plane of a principal section of the prism. The mechanism for supporting and rotating the prisms 19 and 20 will be described later.

In the first focal plane is a cylindrical lens 9 which has no lens action in the plane of Fig. 1. The entrance pupil 10 is a real image of erector lenses 4 and 5 formed by the combined action of objective lens 3 and plano-concave lens 7 which is placed at the first image plane to properly position the entrance pupil in prism 20, lens 9 being disregarded in the plane of Fig. 1. The plano-concave lens 8 is positioned at the second image plane to position the exit pupil suitably for the eye position. While the entrance pupil 10 is shown in Fig. 1 as existing in a single plane, this is really an equivalent pupil, as the actual pupil may be complex and made up of a number of components. As shown in Fig. 10, as the erector lenses 4 and 5 of Fig. 1 are axially separated, their images produced by lenses 3 and 7 and which comprise the entrance pupil, are likewise axially separated as indicated by the planes 104 and 105, although the result is essentially the same as if a single stop were imaged in the plane 106 as indicated in Fig. 10. In the plane of Figs. 3 and 11, the cylindrical lens 9 is effective as a lens in imaging the two erector lenses 4 and 5 in the planes 107 and 108 respectively and the result again is essentially the same as if a single stop were imaged as indicated at 109 in Figs. 3 and 11.

In Fig. 1, the bundle of rays passing through the pupil 10 from the object field, which in this case may be assumed to be distant, are shown at 11 passing toward the lens 3 from the center of the object field and at 12 and 13 from the edges of the object field. For simplicity, the bundles of rays passing through the lenses are not shown, being unnecessary for an explanation of the present invention. 14 is the exit pupil of the periscope 100 with the pupil of the observer's eye 15, placed in coincidence therewith. 16 represents the bundle of rays entering the eye from the center of the object field and 17 and 18 the bundles from the edges of the object field. 19 is a prism, here indicated as a double dove or double isoceles prism, for rotating the line of sight in a plane normal to the plane of Figure 1, or in azimuth, and 20 is also a double dove or double isoceles prism for rotating the line of sight at right angles in the plane of Fig. 1 or in elevation. Each prism 19 and 20 is mounted for rotation about its axis of symmetry.

If the entrance pupil were placed outside of the front prism 20, this prism would have to be considerably larger, otherwise the rays 12 and 13 from the edge of the field would not pass through or might miss it completely. To pass a wide field and keep the size of prisms 19 and 20 small, the entrance pupil in one plane is positioned in the front prism 20 as indicated at 10, and in the plane at right angles thereto is positioned in the rear prism 19 as indicated at 109, see Fig. 3. This is made possible by reason of the fact that the axes of prisms 19 and 20 are at right angles to each other, and by the use of the cylindrical lens 9 which has no lens action in the plane of Fig. 1 whereby the objective 3 and lens 7, in that plane image the entrance pupil in the front prism 20 as indicated at 10, whereas the cylindrical lens 9 acts as a lens in the right angle plane indicated in Fig. 3, in conjunction with lenses 3 and 7, to image the entrance pupil in that plane in the rear prism 19 as indicated at 109. As apparent from Figs. 2, 3, 10 and 11, the lens 9 in conjunction with its associated elements forms a bundle of light which is narrowest in the direction of width in each prism 19 and 20, respectively, and wider in the axial direction of each prism. Hence, the advantages of maximum field angle and minimum size of prisms is obtained. The same result can be obtained in other ways. For example, the conditions of Fig. 3, in the plane of that figure, could be accomplished with lens 9 acting as a plane parallel plate by giving lenses 3 and/or 7 more positive power or by shifting the prisms 19 and 20 toward the left. In this case, lens 9 in the right angle view of Fig. 2 would be a concave negative lens and would position the pupil in prism 20 in this plane. In other words, lens 9 would be a negative cylindrical lens with its axis in the plane of Fig. 3.

This alternative embodiment is illustrated in Figs. 14 and 15. In the embodiment of Fig. 14 periscope 300 comprises a telescope 301 facing the telescope 302, and mutually perpendicular prismatic scanning elements 219 and 220 mounted in front of the objective 203 of the telescope 301 adjacent the entrance pupil of the instrument. In Fig. 14 as in Fig. 1 the axis of the rear scanning element lies in the plane of the figure, and in Fig. 15 as in Fig. 3 the axis of the rear scanning element is perpendicular to the plane of the figure. The elements of the telescope 302 of Fig. 14 may, although they need not, be identical with the elements of the telescope 102 of Fig. 1 which bear respectively reference numbers smaller by two hundred than the reference numbers of Fig. 14. In the telescope 301 of Fig. 14 the elements may be similarly identical to the elements of the telescope 101 of Fig. 1 with two exceptions required to make the changes noted in the preceding paragraph. The first of these exceptions is that the cylindrical lens 209 of Fig. 14 is of negative instead of positive power and is rotated 90° about the axis 303 from the position of the cylindrical lens 9 in Fig. 1. The axis of the cylindrical lens 209 therefore lies in a meridian of the system of Fig. 14 perpendicular to the axis of the rear scanning element 219 and coplanar with the axis of the front scanning element 220. The second exception to the correspondence between the elements of the telescopes 301 of Fig. 14 and 101 of Fig. 1 is that either the lens 203 (or the lens 207) of Fig. 14 has slightly greater power than its counterpart in Fig. 1, or that the prisms 119 and 120 are both spaced farther to the left of the objective 203 than the prisms 19 and 20 are spaced from the objective 3 in Fig. 1.

The performance of the embodiment of Figs. 14 and 15 is closely similar to that of the embodiment of Fig. 1 as will now be explained. The cylindrical lens 209 having its cylindrical axis perpendicular to the meridian plane of Fig. 14 possesses power in that plane and conversely possesses no power in the perpendicular meridian plane of Fig. 15. It thus performs as a plane parallel plate in the plane of Fig. 15, which corresponds to the plane of Fig. 3. In the plane of Fig. 15, the entrance pupil of the instrument, comprising the image of the aperture stop provided by the erector lenses 204 and 205 which is formed by all lenses to the left of these erector lenses, will be focused in the rear prism 219. As indicated in the second preceding paragraph this result is achieved by modifying the structure of Fig. 1 either by increasing the converging power of the objective 203 or the field lens 207 or by moving the prismatic scanning elements 219 and 220 farther away from the objective 203. On the other hand in the meridian plane of Fig. 14, which corresponds to Figs. 1 and 2, the cylindrical lens 209, acting as a negative concave lens, throws the entrance pupil image out from the position of the rear prism 219 to the position occupied by the front prism 220.

Thus both in the embodiment of Fig. 1 and that of Fig. 14 the introduction of a cylindrical lens results in splitting the entrance pupil so that it is focused at two separate axial positions. In both embodiments the cylindrical lens is oriented with its cylindrical axis perpendicular to the optical axis of the system at the position occupied by the cylindrical lens and perpendicular also to the meridian plane of the system occupied by the axis of the scanning prism which is located along the axis of the system at the position which the entrance pupil would occupy as a stigmatic image but for the cylindrical lens.

If we define as perpendicular two skew lines which are so oriented with respect to each other that a plane which contains the shortest line segment joining the two lines and which also contains one of the skew lines will be perpendicular to the other skew line, we may omit the meridian plane from the above statement of condition. The cylindrical axis of the cylindrical lens in both embodiments may then be said to be oriented perpendicular to the optical axis of the system at the location of the cylindrical lens and also perpendicular to the axis of the scanning prism which is located at the position along the optical axis of the system which the entrance pupil would occupy as a stigmatic image but for the cylindrical lens.

In both embodiments the result of so interposing a cylindrical lens is to retain the pupil in focus in the prism which is located at the stigmatic pupillary image position as regards definition in planes perpendicular to the axis of that prism, and to shift the focus of the pupil to the other prism as regards definition in planes perpendicular to the axis of the other prism. Accordingly a minimum allowable cross-section in size is attained for both prisms in both embodiments. Of course the power of the cylindrical lens must be properly proportioned to the desired axial separation of the two scanning prisms.

Referring again to the embodiment of Fig. 1 and to Figs. 4 and 5, which are plan and elevation views respectively, rotation of prism 19 will produce an azimuth deflection. Rotation of prism 20 on its axis will produce an elevation deflection. Prism 20 is arranged to rotate around the axis 23 of prism 19 at twice the speed at which prism 19 rotates, so that the central field rays will always be normal to the axis 24 of prism 20. Consequently, because of its rotation and length, prism 20 will pass the full field in azimuth within a wide range of rotation of the system in azimuth.

Figs. 4 and 5 show the condition for a 90° azimuth rotation. Thus the line of sight can be rotated ±90° in azimuth or a total of 180°. Likewise, since by rotating prism 20 on its axis 24 the entire field can be rotated ±90° in elevation and by rotating the elevation prism 20 and the azimuth prism 19 around the azimuth axis 23, the entire field can be rotated ±90° in azimuth. Consequently the line of sight can be directed anywhere within the hemisphere whose bounding plane is normal to the optical axis 103 of the instrument, without any discontinuities in that hemisphere. Such discontinuities occur where the line of sight reaches the bounding plane laterally disposed of the optical axis, and not in front of the instrument or in the neighborhood of the peak of the hemisphere. It should be noted that in the above discussion, azimuth and elevation are arbitrary designations to denote motion in polar coordinates; azimuth representing rotation around the polar axis 23.

Azimuth thus represents rotation about the polar axis and elevation represents rotation in planes containing the polar axis. The polar axis of the system of polar coordinates so defined is established by the axis of rotation of the scanning element closest to the objective. Rotation of the rear scanning element closest to the objective provides the first deviation of the optical axis of the instrument which is produced by the scanning system, and the front scanning element furthest from the objective is arranged to rotate about this polar axis in order to intercept the line of sight deviated by the rear scanning element so that in rotating about its own axis the front scanning element may deviate the line of sight in elevation.

The system illustrated is useful as a gun sight for the control of remote operated guns which customarily use this polar coordinate system. This is particularly true of aircraft installations. However the system is not limited to this use and may be used in any orientation where this type of motion is desirable.

Figs. 6 and 8 show in elevation and plan, respectively, a means of holding the azimuth and elevation prisms and for rotating the elevation prism 20 around the axis of the azimuth prism 19 at twice the speed of rotation of the azimuth prism 19.

Fig. 6 is an elevation view of Fig. 8 with prism cradle 32 rotated 90°, showing in addition the mounting arrangement for the objective lens 3, cylindrical lens 9 and plano concave lens 7 together with shafts, gears, and bearings for driving the azimuth and elevation prisms. In this view the line of sight is deviated 90° in azimuth.

In Fig. 8, the line of sight is in the undeviated or neutral position.

Referring to Figs. 6 to 9; 25 is the end of the telescope tube, not shown, to which the objective lens, the prisms and their associated rotating mechanisms are mounted, and on which are mounted the bracket 26 and bracket 27. Azimuth prism 19 is held in prism mount 28 which is capable of rotation about axis 23 provided by pivot shaft 29 mounted in bracket 26, and shaft 56 and bearing 30, supported by bracket 27. Azimuth prism worm gear 31 is attached to the shaft 56 of prism mount 28. The cradle 32 is mounted rotatably about axis 23 by means of a bearing 33 mounted on the pivot shaft 29 and a bearing 34 mounted in bracket 27. The cradle drive gear 35 is mounted on the hollow shaftlike projection of the cradle 32. Bearing 36 in gear 35 and bearing 37 in cradle 32 provide the coaxial support of the elevation drive gear 38.

The shaft of gear 38 is hollow permitting the passage of the shaft 56. Rotation of elevation drive shaft 48 on which is mounted bevel gear 49, which engages with bevel gear 39 attached to the shaft of elevation gear 38 which in turn meshes with a train of gears 40, 41, and 42 mounted on the cradle 32, rotates worm 43 which meshes with worm gear 44 attached to the elevation prism mount 45 which is pivoted between centers 46 and 47 supported by cradle 32, causing rotation of elevation prism 20 on axis 24.

The azimuth drive shaft 50 is also mounted in bearings in bracket 27. Rotation of shaft 50 with its attached spiral gear 51 results in rotation of spiral gear 52 attached to the shaft of cradle drive worm 53 and also spiral gear 54 attached to the shaft of azimuth prism drive worm 55 which actuates worm gear 31 mounted on shaft 56 of azimuth prism mount 28, thus rotating the azimuth prism 19 on axis 23. At the same time, cradle drive worm 53 rotates worm gear 35 at twice the speed of worm gear 31. The pitch of worm 53 is double that of worm 55 as shown in Fig. 7. Gear 35, being fixed to cradle 32, rotates the cradle 32 bearing the elevation prism 20 about axis 23 through twice the angle of azimuth prism 19.

In the mechanism here described, rotation of the cradle 32 in azimuth results in a slight rotation of the elevation prism 20 about the axis 24 of an amount equal to $AR/N$ where A is the angle through which the cradle rotates in azimuth, N is the reduction of the elevation worm 43 and gear 44 and R is the ratio of gears 38 and 42. A corrective rotation of shaft 48 is made earlier in the drive by means of a differential gear system (not shown) operating between the azimuth input shaft 50 and elevation input shaft 48 resulting in correct elevation and azimuth deviations of the line of sight.

With regard to the image erection in this system, referring to Fig. 1, the image formed at the first focal plane would normally be inverted. However, one of the prisms ahead of this lens produces a vertical inversion and the other a lateral inversion. Consequently the first image formed is erect. The erector system 4, 5, produces an inverted image of this first image. The eye piece 6, which views this second image has no effect on the image erection. Consequently the image produced at the eye in the system of Fig. 1 will be inverted, and it is necessary in the final instrument to provide some other lenses, prisms or mirrors to erect the final image, as well known.

An example of a relay system to obtain an erect image is shown in Fig. 12 wherein the periscope 70 has an eye piece 71, mirrors 72, 74, 75 and 77, erector lenses 73, 76, objective lens 78, cylindrical lens 79 like lens 9 in Figs. 1 to 5, first focal plane 80, second focal plane 81, also azimuth prism 82, and elevation prism 83, corresponding to the prism 19 and 20 described in connection with the other figures of the drawing. The elements 71, 81, 72, 73 and 74 really lie, rotated 90° around the axis between mirrors 74 and 75, in a plane normal to the plane of the drawing.

The objective 78 forms an image at the first focal plane 80. The image formed at this plane 80 is erect due to the two prisms 82, 83, ahead of objective 78. The erector lenses 73, 76, form an image of the same size at the second focal plane 81. The mirrors 72, 74, 75, 77, erect the second image which in turn is viewed by means of the eye piece 71.

The sight of Fig. 12 was constructed and designed to cover a field of view of 70° (except where limited by the boundaries of the hemisphere). The point of aim can be set anywhere within the hemisphere. The prism system 82, 83, is designed to give a 6 mm. dia. exit pupil for a unit power telescopic system. The edge field pupil for this system is approximately 50% of the center field pupil.

The relay system of Fig. 12 was built to take advantage of existing parts. Other systems can be substituted to give optimum mechanical size for the eye positions desired.

As shown in Fig. 13 the periscopic hemisphere sight protrudes through the side wall 90 of an aircraft. The vertical polar axis 91, provided by prisms 19 and 20, is parallel to the vertical polar axis 92 of the turret 93. This provides for the continuous scanning of a lateral hemisphere bounded by a great circle passing through the poles. Among the advantages of this arrangement are that by maintaining the axis 91 of the sight parallel to the axis 92 of the turret, there is no necessity for conversion of coordinates in the transmission of data between the two. Similarly, the invention may be applied to nose, tail and other installations.

The invention may also be applied to installations where the axis of the coordinate system is not vertical but where the axes of the sight and turret are parallel or, if not parallel, where suitable coordinate conversion is provided between the two.

Various modifications may be made in the invention without departing from the spirit of the following claims.

I claim:

1. In an optical instrument having an objective and an entrance pupil and having a focal plane behind said objective at which the said objective focuses images of distant objects, the combination with said objective of means substantially in said focal plane astigmatizing the entrance pupil to lie in front of said objective at separated loci, and scanning devices arranged one in front of the other and having mutually perpendicular axes of rotation for directing a line of sight from an object field into said objective, said scanning devices being arranged at said loci respectively.

2. In an optical instrument having an objective, and having a focal plane behind said objective at which the said objective focuses images of distant objects, and an entrance pupil in front of said objective, the combination with said objective of azimuth and elevation scanning elements in front of said objective and in position to deflect a line of sight incident on said elevation element to said azimuth element and from said azimuth element into said objective, means supporting each of said elements for rotation about its own axis with one of said axes at right angles to the other axis, and a cylindrical lens substantially in said focal plane, said lens having a cylindrical surface having an axis parallel to the axis of one of said scanning elements and at right angles to the axis of the other scanning element, said objective and said lens having refractive power to position said entrance pupil partly in one of said scanning elements and partly in the other scanning element.

3. In an aircraft having a turret rotatable about a polar axis, the combination with said turret of a telescope having an optical axis and a scanning device for said telescope adapted to deviate the line of sight of said telescope over a substantially hemispherical solid angle, said scanning device comprising a rear scanning element having a plane light-reflecting surface, means supporting said rear scanning element for rotation about an axis of rotation parallel to its light-reflecting surface and at right angles to said optical axis and parallel to said turret polar axis, a front scanning element having a plane light-reflecting surface, means supporting said front scanning element for azimuthal adjustment around the axis of rotation of said rear element, and means for rotating said front element on its own axis of rotation parallel to its light-reflecting surface and perpendicular to the axis of rotation of the rear element for scanning in elevation.

4. In a telescope having an objective, an aperture stop, and axially separated prismatic scanning elements mounted in front of the objective, said scanning elements having their prismatic axes mutually perpendicular and having the prismatic axis of the element closer to the objective disposed perpendicular to the optical axis of the telescope, a cylindrical lens interposed between the objective and aperture stop adjacent a plane at which the telescope focuses images of distant objects for astigmatizing the image of the aperture stop produced by the elements of the telescope between the aperture stop and scanning elements, said cylindrical lens having its cylindrical axis disposed perpendicular to the axis of the telescope and parallel to the prismatic axis of the element closer to the objective.

5. In a telescope having an objective, an aperture stop, and axially separated prismatic scanning elements mounted in front of the objective, said scanning elements having their prismatic axes mutually perpendicular and having the prismatic axis of the element closer to the objective disposed perpendicular to the optical axis of the telescope, a cylindrical lens interposed between the objective and aperture stop at a plane at which the objective focuses images of distant objects for astigmatizing the image of the aperture stop produced by the elements of the telescope between the aperture stop and scanning elements, said cylindrical lens having its cylindrical axis perpendicular to the axis of the telescope and perpendicular to the prismatic axis of the element closer to the objective.

6. In a telescope having an objective including spherical refracting elements, an aperture stop, and axially separated prismatic scanning elements mounted in front of the objective, said scanning elements having their prismatic axis of the scanning element closer to the objective disposed perpendicular to the optical axis of the telescope, one of the said scanning elements being disposed axially of the telescope at the position of the entrance pupil produced by all spherical elements of the telescope, a cylindrical lens interposed between the objective and aperture stop at a plane at which the objective focuses images of distant objects, said cylindrical lens having its cylindrical axis disposed perpendicular to the axis of the telescope and perpendicular to the prismatic axis of the said one of the said prismatic elements.

7. A scanning device for a telescope having a plurality of refracting elements, said refracting elements including a plurality of spherical components symmetric in an optical axis, said scanning device comprising a first scanning element having a plane reflecting surface, a first mounting means supporting said first scanning element in front of the telescope for rotation about an axis parallel to its reflecting surface, the said axis of rotation being perpendicular to the optical axis of the telescope, whereby the optical axis of the telescope is deflected in a plane containing the optical axis of the telescope prior to this deflection, a second scanning element having a plane reflecting surface, a second mounting means supporting said second scanning element in front of the telescope for rotation about an axis parallel to its said reflecting surface, the said axis of rotation of the second scanning element being perpendicular to the axis of rotation of the first scanning element, said second mounting means further supporting said second scanning element for circular motion about the axis of rotation of the first scanning element, a cylindrical lens mounted adjacent a focal plane of the telescope at which the telescope focuses images of distant objects, with its cylindrical axis perpendicular to the optical axis of the telescope and coplanar with the axis of rotation of one of the said scanning elements, the one of the said scanning elements having its axis of rotation coplanar with the cylindrical axis of the said cylindrical lens being located axially along the axis of the telescope adjacent the entrance pupil of the telescope as defined by all refracting elements thereof, and the other of the said scanning elements being located axially along the axis of the telescope adjacent the entrance pupil of the telescope as defined by all spherical components of the telescope.

8. A scanning device for a telescope comprising front and rear double dove prisms mounted with their prismatic axes mutually perpendicular, the prismatic axis of the rear prism being perpendicular to the optical axis of the telescope at the axial location of the rear prism, means for supporting each of the prisms for rotation about an axis parallel to its prismatic axis, and means for further rotating the front prism about the axis of rotation of the rear prism at an angular velocity equal to twice the angular velocity of rotation of the rear prism.

9. In an image-forming optical instrument including an objective, an aperture stop, axially separated scanning elements having plane reflecting surfaces, and mounting means supporting said scanning elements in front of the objective for rotation about mutually perpendicular axes, said axes being respectively parallel to the reflecting surfaces of their scanning elements, means to astigmatize the image of the aperture stop produced by refracting and reflecting elements between the aperture stop and scanning elements, said astigmatizing means comprising lens means located adjacent a focal plane of the instrument at which images of distant objects are focused, said lens means having a maximum curvature in a meridian parallel to the axis of rotation of one scanning element and a minimum of curvature in a meridian parallel to the axis of rotation of the other scanning element.

10. In an image-forming optical instrument having an objective, an aperture stop and axially separated prismatic scanning elements mounted in front of the objective, said scanning elements having their prismatic axes mutually perpendicular, with the prismatic axis of the element closer to the objective disposed perpendicular to the optical axis of the instrument at the axial location of the said closer element, a lens disposed adjacent a plane between the aperture stop and scanning elements at which the instrument focuses images of distant objects, said lens having a maximum curvature in a first meridian parallel to the meridian of the prismatic axis of one of the scanning elements and a minimum curvature in the meridian at right angles to the first meridian.

11. A scanning means for deviating a line of sight comprising front and rear prismatic scanning elements each having a light-reflecting surface parallel to its prismatic axis, said elements having mutually perpendicular axes of rotation parallel to their respective prismatic axes, separate means for supporting each of said elements for rotation about its own axis of rotation, and a third means supporting said front element for rotation in azimuth around the axis of rotation of said rear element through double the angle of movement of the rear element about its own axis of rotation.

12. An optical system having axially symmetric image-forming means and also having on one side thereof an aperture stop and a focal plane at which said image-forming means focuses images of distant objects, said focal plane lying between said image-forming means and said aperture stop, in combination with lens means adjacent said focal plane having different powers in two mutually perpendicular meridian planes for imaging said aperture stop astigmatically in two axially separated planes on the other side of said image-forming means, whereby the image-forming light rays capable of passing through said image-forming means and through said aperture stop form on said other side of said image-forming means an astigmatic bundle whose least dimension at one of said axially separated planes lies in one of the said mutually perpendicular meridian planes and whose least dimension at the other of said axially separated planes lies in the other of said mutually perpendicular meridian planes.

13. In combination with a telescope, a scanning device mounted in front of said telescope, said scanning device comprising front and rear mutually perpendicular prismatic scanning elements each having a plane reflecting surface, said elements being adapted to deviate the line of sight of said telescope over a hemispherical field of view bounded by a plane perpendicular to the optical axis of the telescope, separate means to support the said elements for rotation about axes of rotation parallel to their respective prismatic axes and to their respective reflecting surfaces with the axis of rotation of the rear element perpendicular to the optical axis of the telescope, and a third means for supporting the front element for rotation about the axis of rotation of the rear element through double the angle of rotation of the rear element about its own axis of rotation, whereby the said elements are adapted to scan the said hemispherical field of view in polar coordinates comprising an azimuth angle measured about the axis of rotation of said rear element as polar axis and an elevation angle measured in planes containing the said polar axis.

14. A wide field periscope having an objective and an aperture stop, in combination with an astigmatic component disposed adjacent a focal plane of the objective intermediate the objective and aperture stop, and a scanning device comprising front and rear specularly reflecting elements disposed in front of the objective, said elements having axes of rotation parallel to their respective reflecting surfaces and perpendicular to the optical axis of the periscope at their respective axial locations and to each other, one of said elements being disposed axially along the axis of the periscope at the focus of the image of the aperture stop produced by the elements of the periscope exclusive of the astigmatic component and the other one of said elements being disposed axially of the periscope at the focus of the image of the aperture stop produced by the elements of the periscope inclusive of the astigmatic component.

15. A scanning device for deviating a scanning axis by successive specular reflections, said scanning device comprising front and rear prisms each having entrance and emergent faces and a reflecting surface, and also each having an axis substantially parallel to its faces and reflecting surface, a cradle, means at the front of said cradle supporting said front prism for tilt movement about its said axis, means supporting said cradle for turning movement about an axis behind and at right angles to the axis of said front prism, and means supporting said rear prism for tilt movement about its said axis and with its said axis substantially coincident with said cradle axis, each of said prisms extending on opposite sides of a line perpendicular to and intersecting both of said prism axes.

16. A scanning device according to claim 15 wherein each of said prisms is a double dove prism.

17. A scanning device according to claim 15 wherein said cradle supporting means comprises bearing supports separated along the cradle axis, said rear prism supporting means also supporting said rear prism between said bearing supports.

18. A scanning device according to claim 15 comprising means for supporting said cradle at the front of a telescope with said rear prism extending longitudinally on opposite sides of and at right angles to the axis of the telescope.

19. The combination of a scanning device according to claim 15 with a wide field telescope having an optical axis, an objective, an aperture stop, an entrance pupil, means supporting said cradle at the front of said telescope with said rear prism extending longitudinally on opposite sides of and at right angles to said optical axis, and astigmatic means supported adjacent a plane at which the telescope focuses images of distant objects for positioning said pupil in each of said prisms, each of said prisms having a length less than the diameter of said objective.

20. The combination according to claim 19 and a fire control turret associated with said telescope, said turret having a polar axis, and means supporting said telescope with its optical axis at right angles to said polar axis and with the axis of said cradle and the axis of said rear prism parallel to said polar axis.

21. A scanning device comprising a cradle mounted for rotation about spaced bearing points, a rear prism mounted for rotation about an axis parallel to its prismatic axis, the axis of rotation of the rear prism being substantially coincident with the axis of rotation of the cradle, and a front prism mounted on the cradle with its prismatic axis perpendicular to the prismatic axis of the rear prism, the front prism being supported on the cradle for rotation with the cradle about the axis of rotation of the cradle and being further supported on the cradle for rotation with respect to the cradle about an axis parallel to its prismatic axis, both of said prisms extending on either side of the line which is perpendicular to and which intersects the axes of rotation of both of said prisms.

22. In an image-forming optical instrument having an objective and an aperture stop, a cylindrical lens mounted adjacent a plane between the objective and the aperture stop at which the objective focuses images of distant objects, said cylindrical lens astigmatizing the image of the aperture stop produced by all elements of the instrument between the aperture stop and the image space, said cylindrical lens being adapted to split the focus of the entrance pupil between two axially separated planes in front of the objective.

References Cited in the file of this patent

UNITED STATES PATENTS

| 1,000,607 | Kellner | Aug. 15, 1911 |
| 1,607,688 | Perrin et al. | Nov. 23, 1926 |
| 1,743,979 | Radford et al. | Jan. 14, 1930 |
| 2,184,615 | Gunther | Dec. 26, 1939 |
| 2,414,608 | Pontius | Jan. 21, 1947 |

FOREIGN PATENTS

| 309 | Great Britain | of 1858 |
| 274,912 | Great Britain | Jan. 25, 1929 |
| 322,460 | Great Britain | Dec. 4, 1929 |

OTHER REFERENCES

Gleichen: (Text) The Theory of Modern Optical Instruments, 1921, published by Imperial House, Kingsway, London, pages 174 and 175.

Jacobs: (Text) "Fundamentals of Optical Engineering," McGraw-Hill, New York, 1943, pages 224, 225, 244, 245 and 247.